July 19, 1932.   G. ROHR   1,868,220
AUTOMOBILE
Filed March 31, 1930
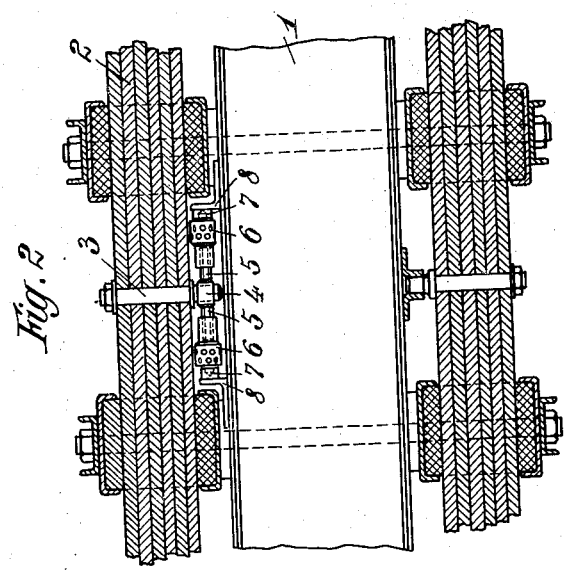
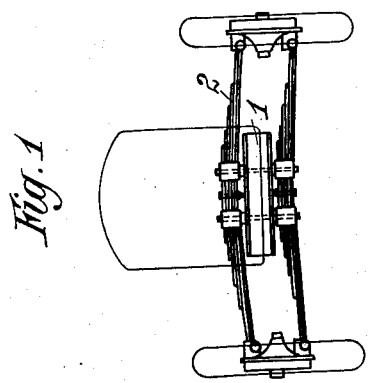
Inventor:
Gustav Rohr
By [signature]
Attorney.

Patented July 19, 1932

1,868,220

UNITED STATES PATENT OFFICE

GUSTAV ROHR, OF OBERRAMSTADT, GERMANY

AUTOMOBILE

Application filed March 31, 1930, Serial No. 440,428, and in Germany April 26, 1929.

My invention relates to automobiles having at least two superposed transverse front springs and has more particularly reference to means for adjusting the set of the front wheels of the car.

The transverse front springs of cars of this type are dimensioned so as to give the front wheels a determined set or inclination, as a rule a set of about 2 degrees relatively to the perpendicular. While it is immaterial whether or not the distance of the vertical middle plane of the two front wheels from the vertical middle plane of the car is accurately the same, it is of the greatest importance in practice for the steering of the car that the front wheels have the same set. Now, in assembling the parts, it frequently occurs that the front wheels show different set due to the unavoidable inaccuracies in the manufacture of the springs.

Hitherto for want of better means one contented oneself to examine and exchange the individual springs until the same set of the two front wheels was obtained.

Now my invention consists in the fact that an adjusting device is provided on the upper or lower transverse front spring or if desired on both of them by means of which device the respective spring or springs can be displaced longitudinally until both front wheels show the same set. In practice my adjusting device is carried out by the bolt which unites the individual leaves of the spring being rigidly connected to a transverse screw bolt having both its ends provided with threads and capable of being displaced by nuts which in their turn abut on the frame of the car.

In order that my invention can be more readily understood, a preferred embodiment of the same is illustrated by way of example in the drawing which accompanies and forms part of this specification. In this drawing Figure 1 is a diagrammatic front view of a car showing the general arrangement of the superposed transverse front springs, while Figure 2 is a front view of my new spring adjusting device on an enlarged scale.

Referring to this drawing, 1 denotes the transverse front bearer of the frame of the car and 2 the individual leaves of the laminated springs joined by a bolt 3. The lower end of bolt 3 is embraced by an eye 4 provided on a horizontal transverse screw bolt 5 on the two threaded ends of which are screwed nuts 6 which by means of outer extensions 7 abut on angle pieces 8 fixed on the transverse bearer 1. In the embodiment illustrated the nuts 6 have no hexagonal shape but a series of holes so that they can be turned by a suitable driver engaging these holes.

What I claim and desire to secure by Letters Patent is:—

1. An automobile comprising a frame, superposed transverse front springs mounted on the frame, and means for individually adjusting at least one of said springs in its longitudinal direction relatively to the frame to adjust the set of the wheels.

2. An automobile having superposed transverse front springs mounted on the frame, a central bolt for at least one of these springs having a transverse bolt rigid thereon having screw threads on both sides, a nut on each of these threaded portions, and an abutment for each of these nuts fixed on the frame.

3. An automobile having superposed transverse front springs mounted on the frame, a bolt having threaded ends and extending along a cross member of the frame and having a central eye, a central bolt for one of said springs engaging said eye, a nut on each of said threaded bolt ends, and an abutment for each of said nuts fixed on said cross member.

4. An adjusting device for transverse springs of automobiles, comprising a pair of spaced abutment pieces mounted on a frame of the automobile, a bolt mounted on the spring at its approximate mid-point, and means on each end of the bolt in screwthreaded engagement therewith and each abutting against its respective abutment, said means being adjustable against the abutment pieces to adjust the spring and thereby the set of the wheels.

5. An adjusting device for transverse springs of automobiles, comprising a central bolt mounted in one spring, and screw means cooperating with the bolt and a frame of the automobile to adjust the spring and thereby the set of the wheels.

In testimony whereof I have affixed my signature.

GUSTAV ROHR.